April 14, 1970     E. BERNER     3,506,533
POROUS PRODUCTS OF FOAMED POLYMERIC MATERIALS AND METHOD OF PRODUCING SAME
Filed Oct. 21, 1965     2 Sheets-Sheet 1
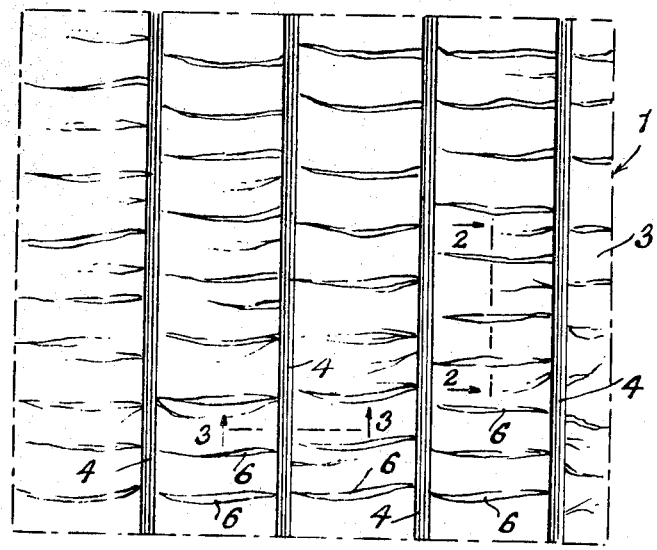
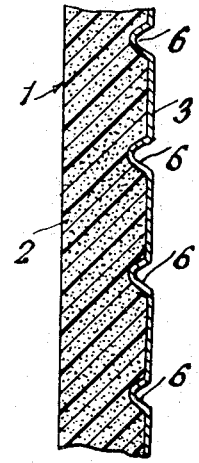
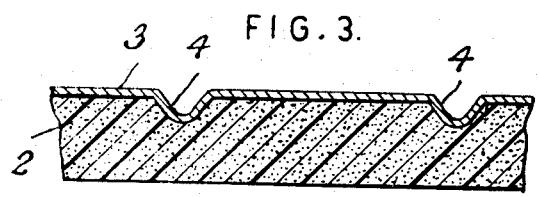
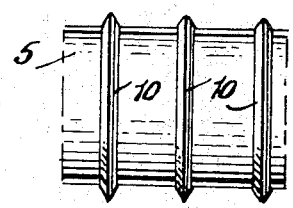
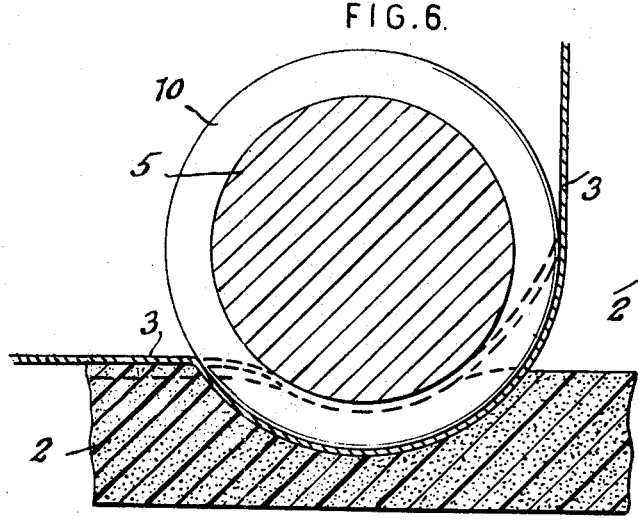
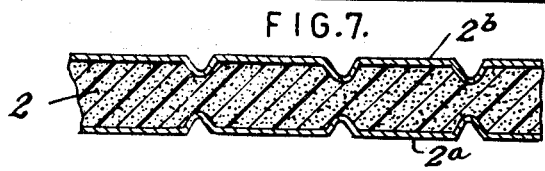
INVENTOR.
Erling Berner April 14, 1970 E. BERNER 3,506,533
POROUS PRODUCTS OF FOAMED POLYMERIC MATERIALS AND METHOD
OF PRODUCING SAME
Filed Oct. 21, 1965 2 Sheets-Sheet 2
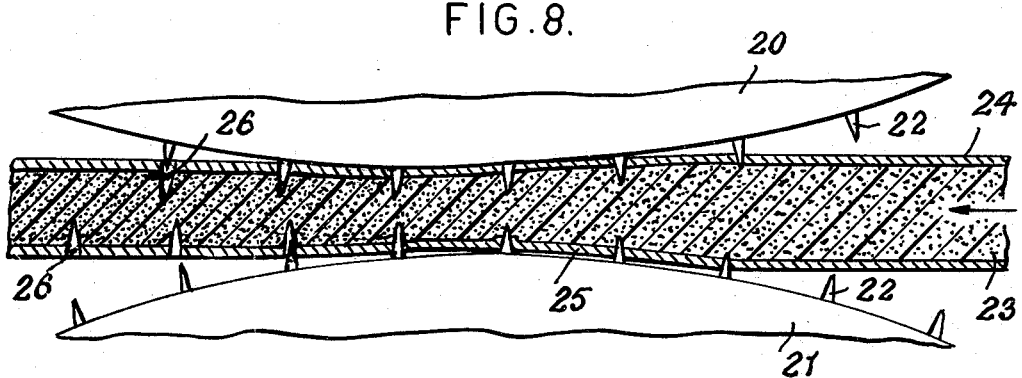
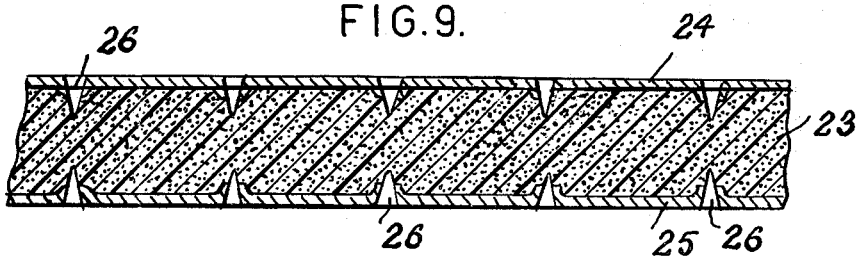
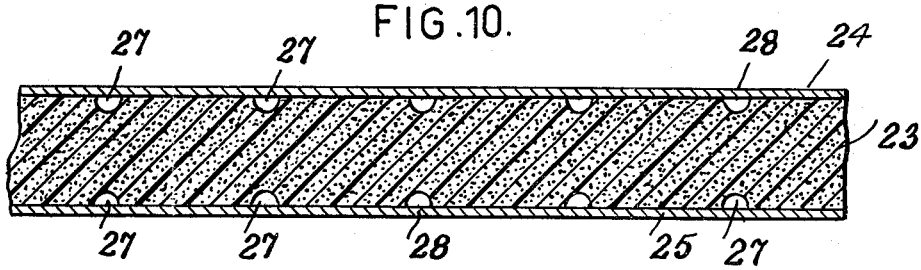
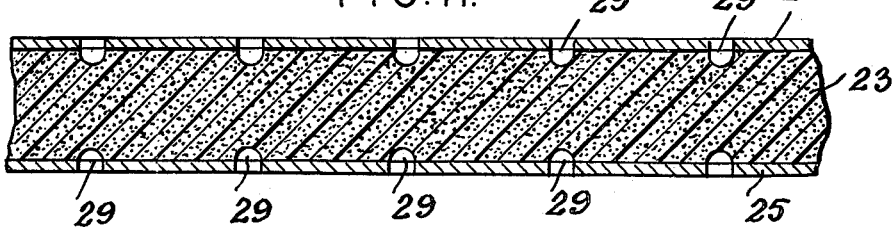
INVENTOR.
Erling Berner United States Patent Office 3,506,533
Patented Apr. 14, 1970

3,506,533
POROUS PRODUCTS OF FOAMED POLYMERIC MATERIALS AND METHOD OF PRODUCING SAME
Erling Berner, New Castle, Pa., assignor to Berner Industries, Inc., New Castle, Pa., a corporation of Pennsylvania
Continuation-in-part of application Ser. No. 223,740, Sept. 14, 1962. This application Oct. 21, 1965, Ser. No. 499,749
Int. Cl. B32b 3/02
U.S. Cl. 161—123
11 Claims

ABSTRACT OF THE DISCLOSURE

A laminated product comprising a base sheet of expanded, cellular polymeric plastic material and a relatively thin, flexible facing material bonded to at least one face of the sheet. The base sheet, by compression and reexpansion to a thickness of less than its original thickness, has a cell structure of reduced dynamic stiffness as compared with the stiffness of the cells as originally formed by the initial expansion of the polymeric material, the cell walls being springy and resilient without being crushed. The facing material is depressed into the base sheet in the form of spaced groves and has wrinkling located in the material between the groves, which wrinkling extends in a direction generally transversely of the grooves. The product so formed has a substantial and unique flexibility, so that it may be bent or shaped to the contour of a surface to which it is applied without fracture. The disclosure further involves a method of making the laminated product from a raw base sheet of relatively stiff polymeric cellular plastic material and a facing sheet. The sheets are superposed and introduced into a zone between an embossing means and an opposed pressure support, heat and pressure acting on the sheets to provide the desired compression and reexpansion of the base sheet, while at the same time adhering the sheets and forming the grooves and wrinkles in the facing sheet.

This application is a continuation-in-part of my copending application Ser. No. 223,740, filed Sept. 14, 1962.

This invention relates to a porous product of foamed, polymeric materials and to a method of producing the same.

It is one of the objects of the invention to provide a laminated product, which because of the facial application of the paper or foil, is rendered stronger and stiffer, yet can be bent or shaped without risk of fracture.

Another object of the invention is to provide a method of laminating paper and other fibrous material, plastic foil or metallic foil by means of heat and/or an adhesive to one or both faces of a porous, foamed polymeric slab or panel and by which method the paper or foil may be applied so as to allow some slight looseness or slack in the form of grooves and wrinkles, thereby permitting the laminated board or panel to be bent without risk of fracture thereof.

The invention, in one of its embodiments, contemplates the provision of a laminated board or panel of the character indicated, which can be used for building insulation for packaging material and for many other purposes.

It is another object of the invention to provide a board or panel of such constrution that moisture entrained or trapped in the insulation material can be readily removed in order to minimize the risk of destroying the adhesion between the foamed material and the paper or foil laminations. One way of solving this problem of eliminating the moisture is to score the board lengthwise before the paper laminations are applied to the board. After the laminating procedure, the board is then cut into lengths and is stored on end with an air space beneath it so that the air will circulate through the scorings and a resultant chimney effect will be obtained and the paper and board will rapidly dry out. Another way is to score the board through the paper laminations, with the scorings or grooves entering the foam insulating material and thereafter store the board vertically as above mentioned.

Still another way of relieving the board of moisture is to punch fine holes through the appplied paper laminations immediately after or simultaneouly with the laminations, which holes penetrate into the foamed material so as to allow the moisture to evaporate. The steps above mentioned will be destribed in detail hereafter.

A further object of the invention is to provide a porous product composed of expanded granules of a polymeric material, such as polystyrene which provides superior insulation against heat and cold with a minimum of mass and weight, when used in walls, ceilings, partitions and the like and which also possess superior sound absorption characteristics.

A still further object is to provide a sound deadening board of increased durability and of minimum mass and weight which has a superior sound or acoustic absorption factor, which can be shaped or bent to conform to the contour of the surface to which it is to be applied with a minimum of risk of fracture, and from which entrained moisture is readily evaporated.

The product according to the invention is preferably in the form of slabs or billets which have been formed by expanding a porous mass of granules or beads of a polymeric material, such as polystyrene, against the resistance pressure of the walls of the mold by diffusing steam or other fluid heating media throughout the porous mass.

These slabs or billets may be formed either by the so-called batch process as exemplified by the U.S. patents to Stastny Nos. 2,779,062 and 2,787,809 or by a continuous process where the beads are fed continuously from a hopper into a moving molding space defined by conveyor belts, into which space, steam or other fluid heating media is diffused to expand the beads against the resistance of the conveyor belts.

The beads or granules preferably have been pre-expanded before being introduced into the mold.

In the accompanying drawings, wherein illustrative embodiments of the invention are disclosed.

FIG. 1 is a face view of a portion of a laminated sheet or panel made according to the invention;

FIG. 2 is a sectional view, taken substantially on the line 2—2 of FIG. 1, looking in the direction of the arrows;

FIG. 3 is a sectional view, taken substantially on the line 3—3 of FIG. 1, looking in the direction of the arrows;

FIG. 4 is a view of a portion of one type of embossing roller used in the laminating process;

FIG. 5 is a diagrammatic view showing how the laminating is done, when lamination is applied only on one side;

FIG. 6 shows the laminating roller and how the same applies the facing material;

FIG. 7 is a sectional view through a laminated board or panel having facing material, such as paper or foil, applied to both of its faces;

FIG. 8 shows the board being perforated;

FIG. 9 shows a section of the board after having been perforated by the pronged rollers or drums shown in FIG. 8;

FIG. 10 is a sectional view of board provided with grooves or recesses behind the face sheets, and FIG. 11 is a section of a piece of board that has had the grooves or recesses formed after it has been laminated.

Referring to the drawings, and more particularly to

FIGS. 1 to 7 thereof, 1 generally indicates a portion of a board or panel constructed according to one embodiment of the present invention. In the form shown, the laminated panel or board consists of a backing or base material 2 composed of porous or polymeric material. The material is preferably composed of expanded, polymeric beads because of the highly non-crushable character of the thus formed cell walls. It should be understood, however, that other expandable or foamed materials may be used, the cell walls of which are non-crushable in nature. Applied to one or both faces of the plastic base is a sheet of paper, plastic foil or metallic foil shown at 3.

The applied paper or foil facing 3, after its applications to the base material 2, appears substantially as shown in FIG. 1. That is to say, the paper or foil facing is depressed into the surface of the backing material 2 at spaced intervals, resulting in the uniformly separated grooves 4, and the formation of these grooves by the rotative operation of an embossing roller 5 causes puckering of the paper or foil sheet. This results in the production of a plurality of irregular wrinkles 6 in the paper or foil, extending between the grooves 4.

A means for applying the paper or foil facing 3 to a face of the plastic base material 2 is shown in FIG. 5, wherein it will be noted that the paper or foil 3 is drawn from a supply roll 7 to pass over an idler 8 and then under the embossing roller 5 which presses it into intimate contact with the plastic base material 2. The plastic base material is supported on conveyor rolls 9 and is moved thereby, along with the facially-applied facing 3. As indicated by the arrow in FIG. 5. A backing roller 12 is located below the embossing roller.

To provide the spaced grooves 4 in the foil or paper facing, the embossing roller 5 is formed with a plurality of annular ribs 10 as shown in FIG. 4, the action of these ribs on the paper or foil resulting not only in the formation of the grooves 4, but causing the wrinkling of the paper or foil between the grooves as indicated at 6. Heating means 11 is located adjacent to the point of application of the facing material or paper or foil to the backing or core. The depression of the paper or foil into the grooves of the plastic base simultaneously with the application of heat will produce a firm bond between the paper or foil and the backing. The degree of wrinkling of the facing material is proportionate to the height of the ribs 10.

The wrinkles 6 formed in the facing material serve to minimize the risk of fracture of the panel even upon excessive bending thereof, because these wrinkles, cooperating with the grooves 4, provide sufficient looseness or slack in the paper or foil, so as to permit it to stretch under the bending stress of the panel.

While I have thus far suggested that the facing material shall be applied to only one face of the material 2, it can also be applied to both faces of the same, substantially as shown in FIG. 7 at 2b and 2a. The application of the facing material to both faces of the base will permit the panel to be bent in either direction without cracking.

As will be noted in FIG. 7, the grooves 4 in the facing paper or foil 2b may be arranged directly opposite to each other if desired, permitting the resultant laminated board or panel to be bent on lines parallel to the grooves without cracking the paper or foil facings. The extent to which the board or panel can be bent depends upon the depth of the grooves 4 in relation to the thickness of the base. If desired, the grooves 4 can be made relatively deep so that a laminated sheet, panel or board used for insulating purposes can utilize the grooves for ventilation. Further, if desired, the grooves on one side may be made deeper than the corresponding grooves on the opposite side of the sheet.

If paper or foil is applied on one or both surfaces of a foamed plastic base of considerable resilience, the resultant laminated material can be applied around ducts and pipes without requiring the material to be cut into small parts or segments in order to be fitted in place.

It will be noted that the facings or paper or foil can be applied to the base material by the application of heat and/or pressure without the use of a separate adhesive. Many problems arise when an additional adhesive is used. However, in some situations these problems may have to be tolerated in the interest of securing a still firmer bond between the panel and the facing material.

The pressure exerted by the rollers or drums between which the lamination takes place causes the panel to be compressed and somewhat flattened and reduced in thickness. However, because of the non-crushable character of the cell walls of the foamed material, the subsequent release of pressure as the panel emerges from between the rolls, the panel will spring back to a thickness which is less than the original thickness.

In the embodiment disclosed in FIGS. 8 and 9, the board is composed of expanded, polystyrene beads or other foamed, polymeric base material or core 23 and has the laminations 24, 25 applied to its opposite faces. As seen in FIG. 9, the lamanae 25 and 24 have been punctured by pins or prongs 22 projecting radially from the peripheries of drums or rollers 20 and 21 between which the laminated board has been passed directly after the application of the face sheets 24 and 25 to the base material 23. The prongs or pins 22 may be suitably spaced apart and they are of such length that they not only pass through the facing sheets but also penetrate into the base material 23 to a desired depth to thereby form recesses therein as shown at 26. These prongs or pins 22 might also, if desired, be made of such length and shape that they merely puncture the face sheets 24, 25 without substantially penetrating into the base material 23. If only one face sheet is used, the side of the panel bearing that sheet will be that which is punctured as above described.

In the embodiment shown in FIG. 10, the base material 23 of the panel is provided with recesses, grooves, or depressions 27 on its opposite faces which have been formed therein prior to the application of the face sheets 24 and 25. As will be seen in FIG. 10, when the face sheets 24 and 25 are adherently applied to the opposite faces of the base 23, such face sheets will bridge or extend over the recesses 27 as indicated at 28. The recesses if in the form of grooves as above suggested, and which extend from one end of the board or panel to the other, will form air passages so that when the board is stood on end with an air space below it, the air passing through the grooves will tend to rapidly dry the base material and the facing sheets applied to it.

In FIG. 11, the board shown therein has its face sheets 24 and 25 punctured, which punctures extend into the base material 23.

The recesses formed in the board may assume various forms, depths and spacing according to various requirements. For example, they may be formed only in the core or base material and not in the face sheets as shown in FIG. 10. They may be formed in one face of the board or panel, and particularly when a facing sheet has been applied to only one side. They can also be in the form of a plurality of small holes equally or unequally spaced apart, or they can be in the form of grooves or in other shapes.

The recesses, holes, grooves or the like will permit the moisture in the base material to evaporate. If the moisture should be allowed to remain trapped in the material it is likely to become absorbed by the face sheets thus causing the latter to blister on the surface of the panel, which not only renders the otherwise smooth panel unattractive but also tends to destroy the bond between the facing sheets and the base. This development becomes particularly apparent after the manufactured boards or panels are stacked on top of one another as is the common practice, so that there is no direct contact between the face sheets and air.

Collectively, the mass of non-interconnecting cells formed by the expanded polystyrene beads impart to the panel a sound resistant property. This property is increased by the compression and subsequent release of pressure which causes a reduction in the dynamic stiffness of the material and renders the panel, which normally is somewhat brittle, springy or resilient. The acoustic absorption factor or sabin of the compressed panel may be still further enhanced by subjecting it to heat treatments during the compression process.

It has been ascertained that a slab composed of expanded polystyrene beads compressed from a thickness of ½ inch to ¼ inch springs back to a thickness of ⅜ inch. The thus compressed and relatively thin panel has been found to have a sound absorption factor equal to or even higher than sound conditioning materials several times thicker.

The sound and acoustic absorption factor will be still further increased by the mass of small holes or recesses in the panel made by pins or prongs 20 and 21. These small holes or recesses extend only partly through the panel and serve the additional purpose of permitting aeration and evaporation of moisture that may become entrapped in the material.

Furthermore, a better bond between the polystyrene foam and the coating thereof is obtained since the needles will press some parts of the laminate deeper into the foam.

It should be understood, however, that in some applications, the face coatings may be omitted, particularly, where the slab is used for sound insulation purposes only. If the slab has become sufficiently resilient or springy by the compression and subsequent release of pressure to serve the desired purpose, the re-inforcing face coatings may be superfluous.

While the product according to the invention has been described specifically as being composed of polystyrene, it should be understood other materials may be used, such as polyurethane, polythene, polypropylene, polyvinyl chloride and co-polymers.

What I claim is:

1. A laminated product comprising:
    a base sheet of insulating material comprising an expanded cellular polymeric plastic material; the cells of said plastic material, by compression and reexpansion of said base sheet to a thickness less than its original thickness, having reduced dynamic stiffness as compared with the stiffness of said cells as originally formed by the expansion of said polymeric material and the said cell walls thereof being springy and resilient; to thereby enhance the acoustic absorption and heat insulating characteristics of said base sheet and increase its flexibility;
    said base sheet having a sheet of relatively thin, flexible facing material bonded to at least one face thereof, said base sheet having a thickness greater than that of said facing material;
    said flexible sheet being depressed into the insulating material in the form of spaced grooves; and
    wrinkling located in the facing material between said grooves, said wrinkling extending in a direction generally transversely of said grooves.

2. A laminated product according to claim 1, wherein said wrinkles are also in said grooves.

3. A laminated product according to claim 1, wherein said grooves are substantially parallel.

4. A laminated product according to claim 1, wherein the thin, grooved and wrinkled sheet is composed of metal foil.

5. A laminated product according to claim 1, wherein said base sheet has a second thin, flexible, grooved and wrinkled sheet on the opposite face thereof; said grooves are substantially parallel; and
    the grooves of the first of said facing sheets are disposed directly opposite the corresponding grooves in the said second facing sheet.

6. A product as set forth in claim 5, wherein the grooves in one of said sheets are deeper than the grooves in said opposite sheet.

7. A product as set forth in claim 1, wherein said flexible facing sheet is perforated, the perforations extending into the base sheet.

8. A method of producing a laminate comprising at least one sheet of thin flexible facing material and, bonded thereto, an expanded plastic polymer base sheet having a thickness greater than that of said flexible facing sheet, at least one of the surfaces of said laminate being provided with a series of grooves, and having wrinkles between said grooves, said method consisting in assembling said base sheet and said facing sheet, and introducing said assembled sheets into a zone between an upper embossing roller, and a lower supporting roller, subjecting said assembled sheets to heat and pressure at the zone between said rollers sufficient to soften said plastic material and to cause said facing sheet to adhere to said base sheet without the use of adhesive, progressively moving said assembled sheets through said zone, and forming a plurality of spaced grooves in said laminate by said embossing roller, and causing said facing sheet to become wrinkled in the area between said grooves.

9. A method according to claim 8 wherein said grooves are formed in each side of said laminate, and are disposed directly opposite the grooves in the other side thereof.

10. The method of producing a laminate comprising at least one sheet of thin, flexible facing material bonded to an expanded, cellular, plastic polymeric base sheet having a thickness greater than that of said flexible facing sheet, comprising the steps of
    assembling said base sheet and said facing sheet in overlying relationship,
    introducing said assembled sheets into a zone between an embossing means and an opposed pressure support,
    subjecting said assembled sheets to heat and pressure at the zone between said embossing means and said support to cause said facing sheet to adhere to said base sheet and to reduce the dynamic stiffness of the said cells of said base sheet, making said cells springy and resilient, and
    at the same time forming a plurality of spaced grooves in said laminate by depressing the said assembled sheets with said embossing means, causing said facing sheet to become permanently wrinkled in the area between said grooves.

11. The method of producing a laminate comprising at least one sheet of thin, flexible facing material bonded to an expanded cellular plastic polymeric base sheet having a thickness greater than that of said flexible facing sheet, comprising
    assembling a base sheet and said facing sheet in overlying relationship,
    introducing said assembled sheets into a zone between an embossing means and an opposed pressure support,
    subjecting said assembled sheets to heat and sufficient pressure at the zone between said embossing means and said support to cause said facing sheet to adhere to said base sheet and to compress said base sheet to a thickness considerably less than that of its original thickness, to thereby reduce dynamic stiffness of said cells, making said cells springy and resilient,
    at the same time forming a plurality of spaced grooves in said laminate by depressing the said assembled sheets with said embossing means, causing said facing sheet to become permanently wrinkled in the area between said grooves, and
    permitting the base sheet and its attached facing to return to a thickness less than its original thickness.

(References on following page)

References Cited

UNITED STATES PATENTS

| | | | |
|---|---|---|---|
| 1,887,759 | 11/1932 | Harney | 156—43 |
| 2,077,438 | 4/1937 | Rowe | 161—128 |
| 2,825,117 | 3/1958 | Evans et al. | 161—128 XR |
| 2,853,411 | 9/1958 | Riley | 161—128 |
| 3,022,207 | 2/1962 | Lang | 161—121 |
| 3,050,432 | 8/1962 | Weinbrenner et al. | 156—196 |
| 3,072,584 | 1/1963 | Karpovich | 264—53 XR |
| 3,082,483 | 3/1963 | Bickford | 264—32 |
| 2,291,171 | 7/1942 | Muench | 52—286 |
| 2,915,787 | 12/1959 | Ewing et al. | 264—284 |
| 3,305,419 | 2/1967 | Voelker | 156—209 |
| 3,384,531 | 5/1968 | Parrish | 156—229 XR |

FOREIGN PATENTS 821,537  10/1959  Great Britain.

JOHN T. GOOLKASIAN, Primary Examiner

H. F. EPSTEIN, Assistant Examiner

U.S. Cl. X.R.

156—209; 161—161

UNITED STATES PATENT OFFICE
CERTIFICATE OF CORRECTION

Patent No. 3,506,533　　　　　　　　　　　　　　　April 14, 1970

Erling Berner

It is certified that error appears in the above identified patent and that said Letters Patent are hereby corrected as shown below:

Column 6, line 72, cancel "return to a thickness less than its original thickness." and insert the same after "to" in line 73, same column 6.

Signed and sealed this 22nd day of December 1970.

(SEAL)
Attest:

Edward M. Fletcher, Jr.　　　　　　　　　　WILLIAM E. SCHUYLER, JR.
Attesting Officer　　　　　　　　　　　　　　　　Commissioner of Patents